US006708489B2

(12) United States Patent
Massey et al.

(10) Patent No.: US 6,708,489 B2
(45) Date of Patent: Mar. 23, 2004

(54) PNEUMATIC ACTUATOR

(75) Inventors: Roger Massey, Portsmouth, NH (US); David Holloway, Deerfield, NH (US)

(73) Assignee: Parker & Harper Companies, Inc., Raymond, NH (US)

( * ) Notice: Subject to any disclaimer, the term of this patent is extended or adjusted under 35 U.S.C. 154(b) by 0 days.

(21) Appl. No.: 09/922,133

(22) Filed: Aug. 3, 2001

(65) Prior Publication Data

US 2003/0024239 A1 Feb. 6, 2003

(51) Int. Cl.[7] ................................................ F16D 31/02
(52) U.S. Cl. .......................... 60/406; 91/417 R; 92/136
(58) Field of Search .......................... 91/417 R, 417 A; 92/136, 135; 60/406

(56) References Cited

U.S. PATENT DOCUMENTS

| | | | | |
|---|---|---|---|---|
| 2,459,695 A | * | 1/1949 | Griffin | 92/136 |
| 3,622,726 A | | 11/1971 | Billon | 200/148 B |
| 3,768,373 A | * | 10/1973 | Divigard | 91/417 R |
| 3,958,493 A | | 5/1976 | Fujita et al. | 91/411 R |
| 4,175,523 A | | 11/1979 | Noguchi et al. | 123/119 A |
| 4,457,210 A | * | 7/1984 | Pauliukonis | 92/136 |
| 4,784,040 A | | 11/1988 | Oswald et al. | 91/461 |
| 4,889,036 A | | 12/1989 | Yoshikawa et al. | 91/403 |
| 5,042,518 A | | 8/1991 | Singhe et al. | 137/2 |
| 5,067,323 A | | 11/1991 | Bennett et al. | 60/734 |
| 5,125,326 A | | 6/1992 | Sarcona | 92/62 |
| 5,661,998 A | | 9/1997 | Genise | 74/335 |
| 6,170,384 B1 | | 1/2001 | Stoll et al. | 92/22 |

* cited by examiner

*Primary Examiner*—Edward K. Look
*Assistant Examiner*—Michael Leslie
(74) *Attorney, Agent, or Firm*—Davis & Bujold, PLLC

(57) ABSTRACT

A double-acting, piston driven actuator for providing a double action rotary powered output, having a stepped bore housing a double acting piston having a larger diameter end and a smaller diameter end therein; a three way valve selectively to supply pressurized fluid to the larger end the pressurized fluid continuously supplying the pressurized fluid to the smaller diameter portion of the bore. An optional safety mechanism having a spring biased second piston for biasing the double acting piston to a safe position upon failure of the pressurized fluid delivery system is also provided.

3 Claims, 4 Drawing Sheets

PNEUMATIC ACTUATOR

FIELD OF THE INVENTION

The present invention relates to a piston driven, double acting rotary output pneumatic actuator. The pneumatic actuator includes a pneumatically driven reciprocating piston capable of being actuated at either end by a pressure system including a pressure source acting through a switchable 3-way valve for directing the pressure and exhaust flow to and from a desired end of the double acting piston to cause reciprocation of the piston and actuation of a rotary output member connected with the piston by a rack. A fail-safe spring mechanism is optionally provided to ensure in the event of a pressure system failure, the actuator will be set to a desired safe position.

BACKGROUND OF THE INVENTION

Conventional double-acting piston driven actuators generally require a four-way valve to operate. While a four-way valve can be replaced in a small valve actuator for example by two three-way valves, i.e. the four-way valve is a functional equivalent of a pair of three-way valves, however, the four-way valve is often more than twice as complex and usually more than twice as costly as a single three-way valve.

SUMMARY OF THE INVENTION

Wherefore, it is an object of the present invention to overcome the above mentioned shortcomings and drawbacks associated with the prior art.

Another object of the present invention is to provide a simpler more economical and efficient pneumatic actuator.

A further object of the present invention is to provide a pneumatic actuator in which a three way valve controls the action of the double acting piston.

Yet another object of the present invention is to provide the double acting piston with a first end which is substantially larger than the second end thus producing a substantially greater force when the piston is actuated in one direction.

A still further object of the present invention is to provide the piston and actuator with a fail safe spring mechanism which is actuated only upon failure of the pneumatic pressure system.

The present invention provides a double-acting, piston driven actuator for providing a double action rotary powered output, comprising; an actuator housing defining a stepped bore, the stepped bore defining a larger diameter bore and a smaller diameter bore, a double acting piston reciprocally inserted within the stepped bore, the double acting piston having a larger diameter end and a smaller diameter end for matching slidable engagement within the respective larger diameter bore and a smaller diameter bore, a pressurized fluid delivery system having a first passage communicating with the larger diameter bore of the stepped bore and a second passage communicating with the smaller bore of the stepped bore, a first end of each of said first and second pressure passages communicating with a constant pressurized fluid source supplying an equal pressure thereto, a three way valve positioned in the first passage between the first end and stepped bore, the valve being controlled by a solenoid and having a first position wherein pressurized fluid supplied to the first end of the first passage is supplied to the larger diameter bore, and a second position wherein the larger diameter bore is exhausted to the atmosphere, and wherein the pressurized fluid delivery system provides the fluid from the source continuously to the smaller diameter portion of the bore.

The present invention also provides a safety mechanism having a spring biased second piston for biasing the double acting piston to a safe position upon failure of the pressurized fluid delivery system.

A three way valve is utilized in conjunction with a pneumatic pressure system to provide alternate pressure and exhaust routes from both ends of a reciprocating, double acting pneumatic piston. The substitution of the three-way valve for a four-way pilot valve also permits use of a spring driven, fail-safe accessory in which the spring, which is intended to operate the piston in the case of pneumatic failure in the system, remains compressed until needed. This operation permits the full output of the piston pinion system to be applied to the load, i.e. a pinion gear, and it also eliminates air consumption required to recompress the spring after each actuator stroke. Conventional spring return actuators utilize the spring to drive the actuator in one direction and require the pneumatically powered piston to recompress the spring as it drives the actuator in the other direction. The presently described invention, in conjunction with this fail-safe accessory spring, is, in fact, a double-acting piston driven actuator having a spring driven fail-safe override. Substitution of the three-way valve for a four-way valve in the pressure system of a small valve actuator also ensure a significant economic advantage and improved dependability.

BRIEF DESCRIPTION OF THE DRAWING(S)

The invention will now be described, by way of example, with reference to the accompanying drawings in which:

FIG. 1(*b*) is a partial sectional view of the conventional double-acting actuator in a second position as dictated by the four-way valve having reversed the pressure and exhaust routes from the first position;

FIG. 2(*b*) is a partial sectional view of the double-acting pneumatic actuator of FIG. 2(*a*) in a second position using the three-way valve to exhaust said one end of the piston;

Figure 3A:
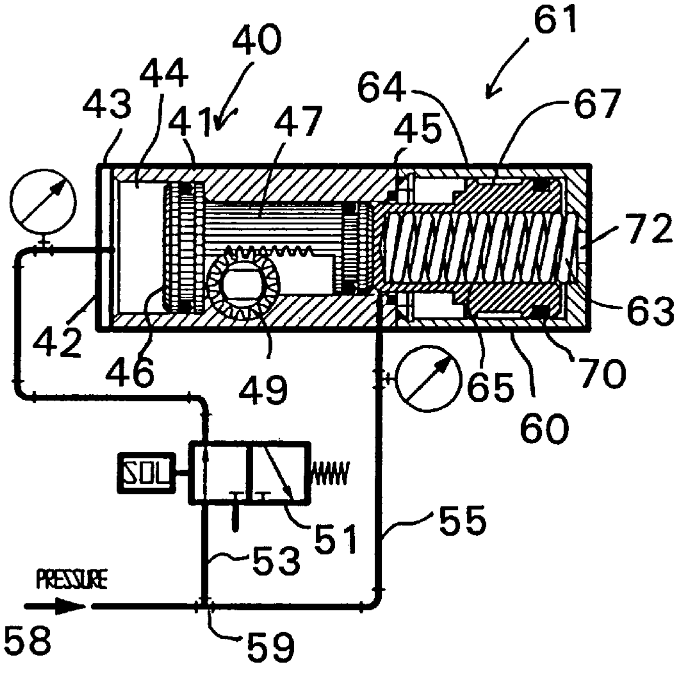
Figure 3B:
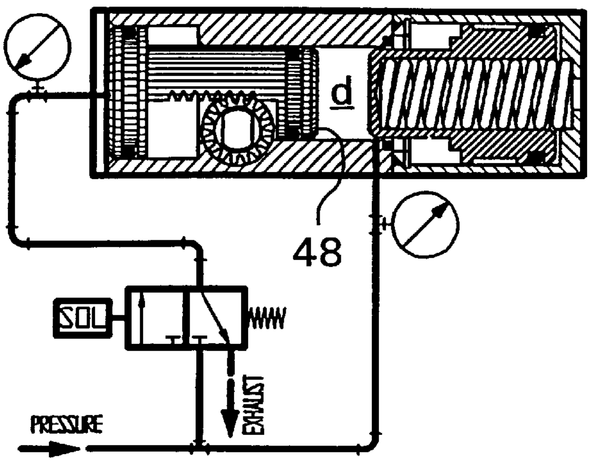
Figure 3C:
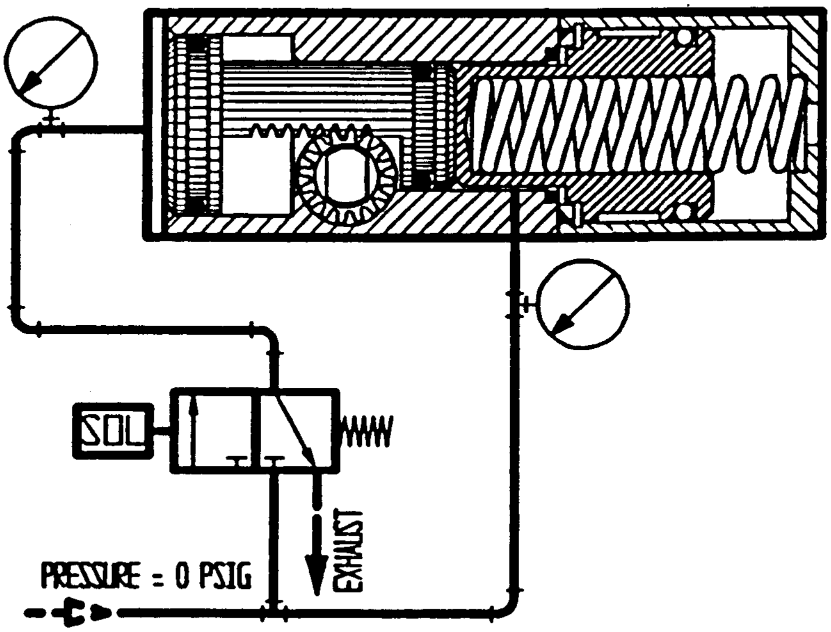

FIGS. 3(*a*), (*b*) and (*c*) are partial sectional views of the double-acting actuator piston of the present invention in combination with a fail-safe spring accessory.

DETAILED DESCRIPTION OF THE INVENTION

Figure 1A:
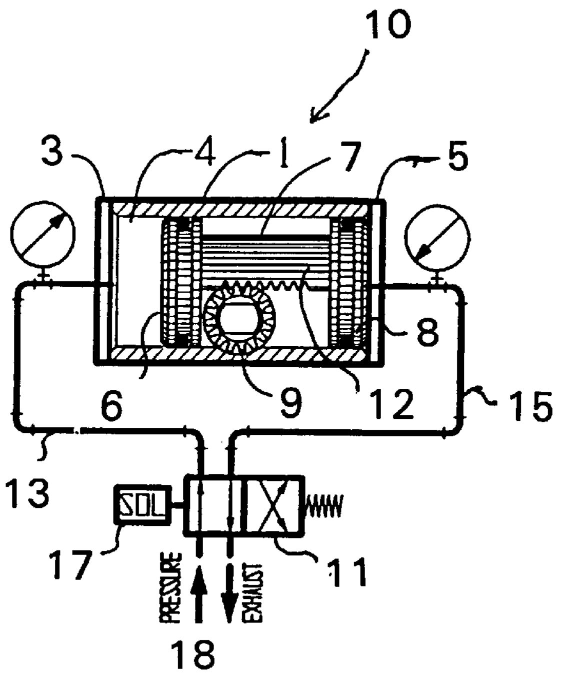
Fig. 1(a) PRIOR ART
FIG. 1(*a*) is a partial sectional view of a conventional double-acting pneumatic actuator in a first position as dictated by a four way valve of an associated pressure system.
Figure 1B:
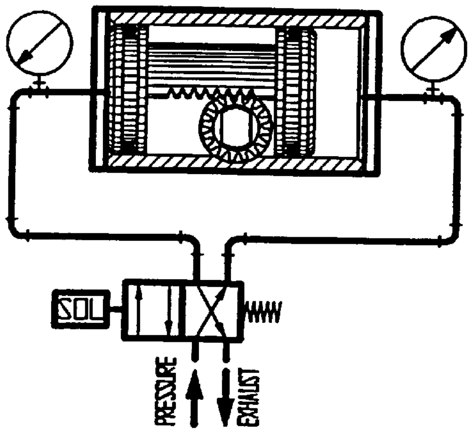
Fig. 1(b) PRIOR ART

Turning now to FIG. 1 which shows a conventional double-acting pneumatic piston rotary actuator 10 and its associated pressurization system. This conventional double-acting pneumatic piston rotary actuator 10 has a cylindrical body 1 defining a bore 4. The bore 4 is sealed from the outside environment at a first end by a first endcap 3 and at an opposite (second) end by a second endcap 5.

A double-acting piston having first and second identically sized ends 6 and 8, is located within the bore 4. Also within the body 1 is a pinion 9 which is engaged with a rack 12 between the ends of the piston 7 such that reciprocating movement of the piston 7 rotates the pinion 9.

The pressure system for reciprocally driving the actuator 10 has a first and a second pressure passages 13 and 15 respectively connected by way of the first and second ends 3 and 5 to the bore 4. The first and second pressure passages 13, 15 provide either pressure delivery or exhaust through the first and section endcaps 3 and 5, respectively. The first and second pressure passages 13 and 15 are controlled by a four-way valve 11 operated by solenoid 17.

FIG. 1(*a*) shows a first position wherein a pressure source 18 delivers pressure to the bore 4 to drive the piston 7 to the right, rotating the pinion 9 in a clockwise direction and exhausting the second end 5 of the actuator body 1.

FIG. 1(*b*) shows a second position, with the four-way valve 11 having been actuated to reverse the pressure and exhaust, compared to FIG. 1(*a*), with the piston 7 having pressure applied to the second end 8 of the piston 7 via the second pressure passage 15 to force the piston to the left with the driving pressure applied via the second pressure passage 15 and exhausting the first end via pressure passage 13.

Turning to FIG. 2(*a*), a first embodiment of the present invention is now described. The double-acting pneumatic actuator 20 has a body 21 having first and second ends 23 and 25 defining a stepped bore 24 therebetween. The first and second ends 23, 25 are closed by endcaps and gaskets to close the bore 24. The stepped bore 24 defines a first portion having a diameter D while a second portion of the bore has a smaller diameter d. A piston 27 is provided with a corresponding larger diameter (D) first end 26 and a smaller diameter (d) second end 28. As in the conventional double acting piston actuator, sufficient pressure on either the larger diameter portion D or the smaller diameter portion d, forces the piston 27 to the right or left respectively and a center portion 22 of the piston 27 carries a rack to rotate a pinion 29.

The larger diameter end 26 of the piston is provided with twice the cross-sectional area of the smaller diameter end 28. The pressure system for reciprocating the stepped piston 27 will now be described.

The pressure system consists of a first pressure passage 33 and a second pressure passage 35 for applying pressure to the larger diameter end D and the smaller diameter end d of actuator body 21 to force the piston 27 in a desired direction. The first and second pressure passages 33 and 35 each have a first end communicating with ends of the stepped bore 24 through the respective first and second ends 23 and 25 of the body 21. The other ends of the first and second pressure passages 33 and 35 receive pressure by way of junction 39 which communicates directly with a pressure source 38.

Figure 2A:
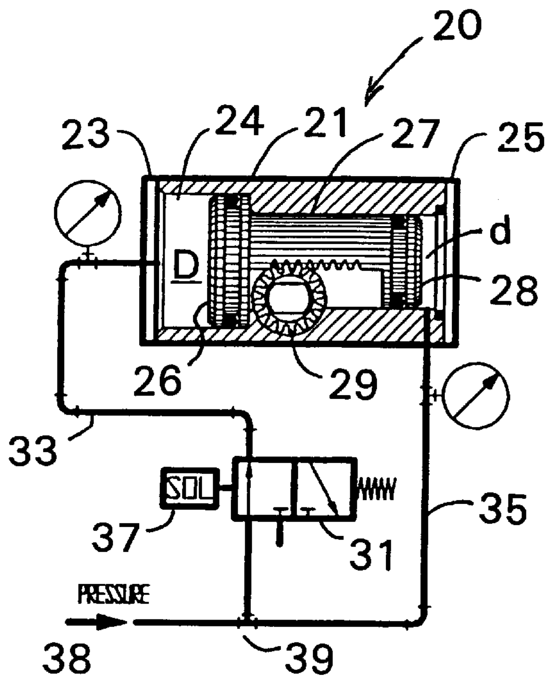
FIG. 2(*a*) is a partial sectional view of the stepped piston double-acting rotary pneumatic actuator of the present invention using a three way valve of an associated pressure system to supply pressure to one end of the piston.
Figure 2B:
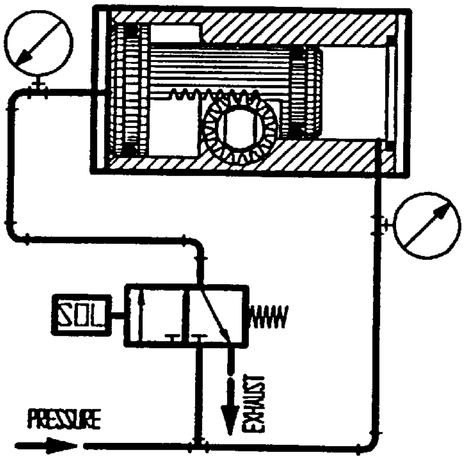

A three way valve 31, actuated by a solenoid 37, is placed in line with the first pressure passage 33 between the first and second ends thereof. As shown in FIG. 2*a*, with valve 31 supplying pressure to the first end 23 of the actuator, the piston is forced to the right, and exhaust gas is exhausted via pressure passage 35 from the smaller diameter portion d of the body 21. Due to the in line three way valve 31 and the solenoid 37 located between the first and second ends of the first pressure passage 33, a constant pressure is therefore provided to the other ends of both the first and second pressure passages 33 and 35 at the junction 39.

The larger diameter portion D of the bore 24 communicates via an opening in the first endcap 23 with the first end of the first pressure passage 33 and the second end 25 of the actuator 20 communicates through a second opening with the first end of the second pressure passage 35. The respective other ends of the first and second pressure passages 33, 35 intersect at the junction 39 which is supplied with a pressure from the pressure supply 38. Due to the location of the valve 31 in line with first pressure passage 33, the pressure supply 38 supplies a constant desired pressure to both the first and second pressure passages 33, 35 at the common junction 39.

The three-way valve is situated in the first pressure passage 33 between the first and second ends thereof, i.e. between the first opening communicating with the larger diameter portion D of the bore 24 and the common junction 39. FIG. 2(*a*) shows the three-way valve in position to deliver supply pressure to the left-hand end, the larger diameter portion D, of the actuator bore 24. Due to the junction 39 equal pressure is also delivered to the smaller diameter portion d of the bore 24 via the second supply passage 35.

Because of the larger diameter end 26 of the piston 27, the surface area in the larger diameter end 26 being twice that of the smaller diameter end 28, twice the force is developed in the larger diameter portion D. The actuator piston 27 is therefore driven to the right.

Turning now to FIG. 2(*b*) the three-way valve 31 has been moved into a second position to exhaust the larger diameter portion D of the bore 24. In this second position the pressure produced by the pressure source 38 is solely delivered to the right hand, smaller diameter end d of the bore 24. No pressure is developed at the larger diameter end D of the bore due to the open exhaust condition of the three-way valve 31, and therefore, the piston 27 is driven to the left applied to the smaller diameter end 28 of the piston 27. It may be seen that the force available to turn the actuator left and right respectively is the same in each direction because the left side of the bore 24 is twice the effective area of the right.

Generating the equal and opposite forces to urge the reciprocating piston 27 to one side or the other is of particular importance where a desired consistent torque is desired from the pinion 9. Thus a consistent torque is generated via the actuator to any machine or function to which the pinion gear and actuator is ultimately connected.

Turning to FIG. 3(*a*), a second embodiment of the present invention is now described. The double acting pneumatic piston rotary actuator 40, similar to that described above with reference to FIGS. 2*a* and 2*b*, is provided with a spring fail-safe accessory 61. The actuator has a body 41 with a first end 43 and a second end 45. The first end 43 is provided with an end cap 42 which encloses a stepped piston bore 44. The stepped piston bore 44 is defined by a portion of the bore 44 provided with a larger diameter D and another portion of the bore 44 having a smaller relative diameter d. The larger diameter D of the stepped bore 44 is twice the area of the smaller diameter d. A further discussion of the benefits of providing the diameter D having a twice the area with respect to the smaller diameter side d will be discussed in further detail below.

A first piston 47 is provided with a respective larger diameter first end 46 and a smaller diameter second end 48 which matingly fits within the respective larger and smaller diameter portions of the bore 44.

Similar to the previous embodiments shown in FIGS. 2(*a*) and (*b*), the pressure system for delivering actuating pressure to the piston 37 consists of a connected first pressure passage 53 and a second pressure passage 55 connected at a junction 59 for delivering a constant driving pressure from a pressure source 58 to the actuator body 41 thus forcing the piston 47 to either one side or the other, depending upon the position of the 3-way valve 51. With pressure provided to the larger diameter first end 46 of the piston forces the piston 47 to the right which in turn actuates the pinion 49, rotating it clockwise via a rack as shown in FIG. 3(*a*). When pressure is shut off to the larger diameter end D of the stepped bore 44, as shown in FIG. 3(*b*) and the pressure acting on the smaller diameter end d forces the piston 47 to the left, rotating the pinion 49 counterclockwise as shown in FIG. 3(*b*).

The pressure system is controlled by the 3-way valve 51 located in line with the first pressure passage 53 between the junction 59 and the connection of the first pressure passage 53 with the first end 43 of the body 40. The actuator 40 is essentially provided with first, second and third operating conditions. With the valve 51 in the first position as shown in FIG. 3*a*, the pneumatic pressure provided at the junction 59 is provided to both the first pressure passage 53 and the second pressure passage 55 and the solenoid driven valve 51 allows to be supplied to the larger diameter bore 44 of the actuator 40. An equal pneumatic pressure is provided through the pressure passage 55, via junction 59, and applied to the smaller diameter bore d of the actuator body 40.

With the valve 51 in the first position, the equal pressure at either end results in a force differential generated by the larger surface area of the piston end 46 and, therefore, the larger force causes the piston to be moved to the right overcoming the force generated at the smaller diameter end 48. It is to be appreciated that where the first end 46 of the piston 47 is twice the area of the second end 48, the force generated by the larger diameter end 46 is twice that of the second smaller diameter end 48 and the piston is moved to the right.

Turning now to FIG. 3(*b*) and again having the pressure supplied at junction 59, the valve 51 is the second position in which exhausts the second end 43 of the actuator 40 through the valve 51.

The pressure P supplied to the smaller diameter end d of the bore 44 and the second end of the piston 47, urges the second end 48 of the piston 47 to the left. This is possible with the valve 41 in the second position because there is no pressure supplied to the larger diameter end D. Therefore, the piston 47 is returned to the left hand side and rotates the pinion 49, respectively.

The importance of generating equal and opposite forces to urge the reciprocating piston 47 to one side or the other is of particular importance where a desired consistent torque is desired from the pinion 49.

The main difference between the first embodiment and the second embodiment of this invention is the addition of the spring driven fail-safe accessory 61 to the second smaller end of the actuator 30. In general, this accessory is utilized to drive the first piston 47 to a predetermined "safe" position shown in FIG. 3(*c*) should the supply pressure fail.

The fail-safe accessory 61 is provided with a spring housing 60 defining a bore 64 within which is positioned a second piston 67 having an internal blind bore 65 and a spring 63 located within the internal blind bore 65 to bias the second piston 67 towards the piston 47. The spring housing 61 is attached to the actuator body 40 and the bore 64 communicates with the second smaller diameter end d of the stepped bore 44.

The second piston 67 is provided with an inactive position in which it is fully located within the bore 64 and the spring 63 is compressed between the end of the fail-safe bore 64 and the end of the internal blind bore 65(FIGS. 3(*a*) and 3(*b*). It is to be appreciated that as seen in FIGS. 3(*a*),(*b*) the piston 67 and spring 63 is inactive but compressed due to the pressure supplied to the second smaller diameter end d of the stepped bore 44 created by the pressure source 58 and delivered via the second pressure passage 55 to the small diameter portion d of the stepped bore 44.

Because there is at all times intended to be a constant pressure supplied to the second smaller end d of the bore 44, the second piston 67 and spring 63 are intended to remain compressed, no matter what position the first piston 47 is in, i.e left or right side of the actuator. However, should pressure fail, as depicted in FIG. 3(*c*), the spring 63 is released to a activated position. In this activated position with no pressure at the smaller diameter end d of the actuator, the extension of the spring 63 forces the second piston 67 to the left thus influencing and pushing the first piston 47 to a "safe" position at the first end 43 of the body 41 and rotating the pinion 49 in a counter clockwise direction.

The fail safe spring accessory 61 is provided with a seal 70 between the piston 67 and a wall of the spring housing. The seal 70 maintains the pressure supplied from the pressure source 58 to the smaller diameter d of the actuator 40 which acts both upon the smaller diameter of the piston 47 as well as the second piston 67 to maintain it in the inactive position. On the other side of the seal, the spring housing is provided with an exhaust bore 72 which communicates between the atmosphere outside the actuator with an air space created by the blind bore in the secondary piston 67 and the spring 63 which is separated from the internal pressure in the smaller diameter end d of the stepped bore 44 by the seal 70. Thus, upon the secondary piston 67 being activated into a second position where it influences the piston 47 moving it to the safe position, in this case, to the left, the exhaust bore 65 ensures that no vacuum is created within the spring housing to retard the movement of the secondary piston 67.

Once the conditions which precipitated the pressure failure of the pressure source 58 have been corrected the second piston 67 may be reset. Once pressure through pressure passage 55 re-establishes pressure within the smaller diameter portion D of the bore of the step bore 44, the second piston 67 has sufficient effective surface area to recompress the spring 63 without assistance from the piston 47. With the spring 63 recompresses in the first position via the constant pressure now again being supplied to the smaller end D of the bore 44, it is to be appreciated that with no force necessary from the piston to recompress the spring, the torque again will remain consistent at any time from cross the pinion 49, if and when the piston 47 is allowed to continue its reciprocating operations.

Since certain changes may be made in the above described invention without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, we claim:

1. A double-acting, piston driven actuator for providing a double action rotary powered output, comprising:

an actuator housing defining a stepped bore, the stepped bore defining a larger diameter bore and a smaller diameter bore;

a double acting piston reciprocally inserted within the stepped bore, the double acting piston having a larger diameter end and a smaller diameter end for matching slidable engagement within the respective larger diameter bore and smaller diameter bore;

a pressurized fluid delivery system having a first passage communicating with the larger diameter end of the stepped bore and a second passage communicating with the smaller end of the stepped bore;

a first end of each of said first and second pressure passages communicating with a constant pressurized fluid source supplying an equal pressure thereto;

a three way valve positioned in the first passage between the first end and stepped bore, the valve being controlled by a solenoid and having a first position wherein pressurized fluid supplied to the first end of the first passage is supplied to the larger diameter bore, and a second position wherein the larger diameter bore is exhausted to the atmosphere;

the pressurized fluid delivery system provides the fluid from the source continuously to the smaller diameter portion of the bore; and a safety mechanism having a spring biased second piston for biasing the double acting piston to a safe position upon failure of the pressurized fluid delivery system.

2. The actuator as set forth in claim 1 wherein the second piston is coaxial with and corresponds to the smaller diameter end of the double ended piston and is in direct communication with the smaller diameter end of the stepped bore.

3. The actuator as set forth in claim 1 wherein while pressurized fluid is supplied to the smaller diameter portion of the stepped bore the spring biased second piston is biased by the pressurized fluid to an inactive condition in which the double acting piston can operate normally.

* * * * *